UNITED STATES PATENT OFFICE.

ADOLPH SOMMER, OF CAMBRIDGE, MASSACHUSETTS.

SOLUTION OF SWEET CARBAMIDS IN OILS, &c.

SPECIFICATION forming part of Letters Patent No. 524,513, dated August 14, 1894.

Application filed March 2, 1893. Serial No. 464,423. (No specimens.)

*To all whom it may concern:*

Be it known that I, ADOLPH SOMMER, of Cambridge, county of Middlesex, State of Massachusetts, have invented a new and useful Solution of Paraphenetol Carbamids in Oils, Fats, Waxes, and Resins; and I do hereby declare that the following is a full, clear, and exact description of the same.

The only methods known so far for imparting a sweet taste to the natural ingestible carbon compounds which are saponifiable and either liquid or liquefiable below 150° centigrade,—to wit: the oils, fats, waxes, resins and the arids occurring therein,—are: to either dissolve therein benzoic sulphinide or to convert them into a sweet emulsion by means of an aqueous viscid substance and a sweetening agent soluble therein. Now I have found that the same object can be accomplished and that these compounds can be sweetened without destroying their transparency and other physical properties (except their taste) by the use of a sweet carbamid as for instance paraphenetol carbamid. I have however observed that in the cold state the neutral compounds of the above mentioned class are almost incapable of dissolving this substance, and that only when heated therewith do they take up a perceptible amount of this substance.

The solubility of the paraphenetol-carbamid in the above mentioned compounds I find to be greatest between 140° and 160° centigrade. Higher temperatures should be avoided, because they darken the mixture and decompose the carbamid, liberating sometimes ammonia.

If too large a proportion of the carbamid has been dissolved by the aid of heat, a portion of it crystallizes out on cooling. But most of the foregoing compounds are capable of retaining sufficient of the carbamid, after solution has once taken place, to impart to them a decidedly sweet taste, even after they have stood in the cold and any undissolved carbamid has been filtered off. The amount thus retained in solution after cooling varies greatly, ranging from scarcely one tenth of one per cent. to over one per cent. of the weight of the compound acting as solvent.

In practice I proceed as follows: I take from two to eight parts (seldom more) of paraphenetol carbamid to every thousand parts of oil, fat, wax, resin or acid occurring therein, triturate the paraphenetol carbamid till it is reduced to an impalpable powder, then incorporate with it the compound to be sweetened in the liquid state and digest the mixture in a steam bath or oil bath between 100° and 150° centigrade. When the carbamid has dissolved, the solution is removed from the bath and allowed to stand in a cool place for a day or longer. If, after thus standing undisturbed, some of the carbamid has crystallized out and the solution is to be transparent at the ordinary temperature, it is filtered through paper or any other medium suitable for the purpose.

Instead of triturating the carbamid and subjecting the mixture to a high temperature, it is sometimes preferable to dissolve the carbamid in a volatile solvent, such as alcohol, to add this solution to the liquid or liquefied compound and to expel the alcohol or other volatile solvent by gently heating the mixture.

Having thus described my invention, what I claim, and desire to secure by Letters Patent, is—

The solution of a sweet carbamid in those natural ingestible carbon compounds which are saponifiable and either liquid or liquefiable below 150° centigrade, substantially as described.

ADOLPH SOMMER.

Witnesses:
L. F. CLAR,
MANSEL DE FREITAG.